(12) United States Patent
Schneider et al.

(10) Patent No.: US 8,096,570 B2
(45) Date of Patent: Jan. 17, 2012

(54) LOCKING CABLE ACTUATOR

(75) Inventors: Richard E Schneider, Cheyenne, WY (US); Harlan H Hart, Madera, CA (US); Samuel D Traxinger, Fresno, CA (US)

(73) Assignee: Sunrise Medical (US) LLC, Fresno, CA (US)

( * ) Notice: Subject to any disclaimer, the term of this patent is extended or adjusted under 35 U.S.C. 154(b) by 0 days.

(21) Appl. No.: 12/907,054

(22) Filed: Oct. 19, 2010

(65) Prior Publication Data

US 2011/0089665 A1 Apr. 21, 2011

Related U.S. Application Data

(60) Provisional application No. 61/252,816, filed on Oct. 19, 2009.

(51) Int. Cl.
*A61G 5/10* (2006.01)
*F16C 1/12* (2006.01)
*B60T 7/10* (2006.01)

(52) U.S. Cl. .................................... 280/304.1; 74/502.2

(58) Field of Classification Search ......................... None
See application file for complete search history.

(56) References Cited

U.S. PATENT DOCUMENTS

| 4,019,752 | A | | 4/1977 | Leon et al. |
| 4,079,990 | A | | 3/1978 | McMunn et al. |
| 4,667,785 | A | | 5/1987 | Toyoda et al. |
| 4,785,683 | A | | 11/1988 | Buckley et al. |
| 5,029,674 | A | | 7/1991 | Boyes et al. |
| 5,492,355 | A | | 2/1996 | Berry |
| 5,896,779 | A | * | 4/1999 | Biersteker et al. ........... 74/502.2 |
| 5,953,962 | A | * | 9/1999 | Hewson ....................... 74/502.2 |
| 6,374,694 | B1 | | 4/2002 | Chen |
| 6,389,928 | B1 | | 5/2002 | Kobayashi et al. |
| 6,464,044 | B2 | | 10/2002 | Suganuma |
| 7,062,988 | B2 | | 6/2006 | Laukkanen |
| 7,066,482 | B2 | | 6/2006 | Ford |
| 7,316,298 | B2 | | 1/2008 | Yeager |
| 7,370,734 | B2 | | 5/2008 | Hallgrimsson |
| 7,975,570 | B2 | * | 7/2011 | Iino et al. ..................... 74/502.2 |
| 2009/0166996 | A1 | | 7/2009 | Spindle |

* cited by examiner

*Primary Examiner* — Tony Winner
(74) *Attorney, Agent, or Firm* — MacMillan, Sobanski & Todd, LLC

(57) ABSTRACT

A cable actuator comprises a housing, a handle, and a locking pin. The handle is pivotally connected to the housing and is moveable between a released position and a locked position. The handle has a slot that terminates in a locking detent. The locking pin has a first end configured to pass through the slot and a second end configured to engage the locking detent. The locking pin is biased toward engagement with the locking detent such that when the lever is pivoted to the locked position, the locking detent aligns with the locking pin permitting the second end to engage the locking detent.

20 Claims, 6 Drawing Sheets

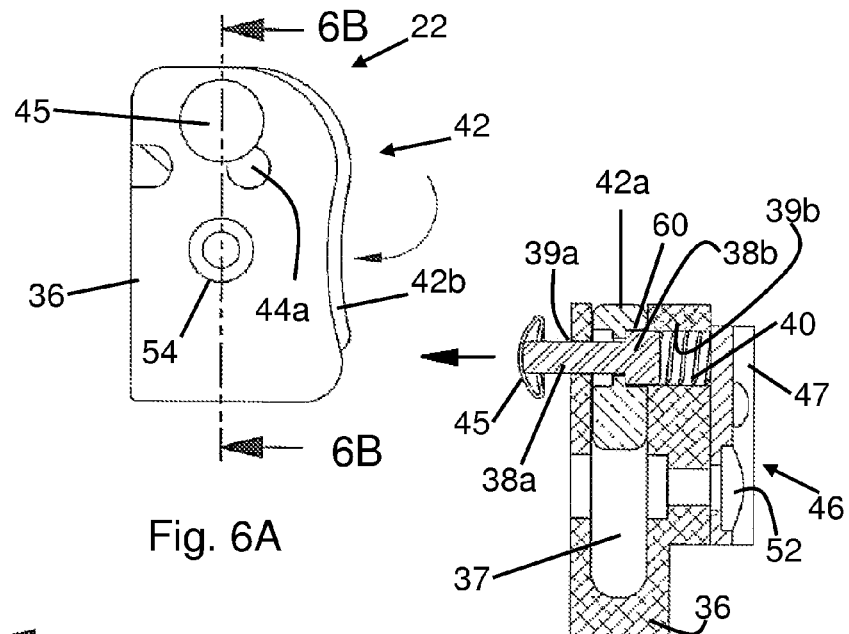
Fig. 6A
Fig. 6B
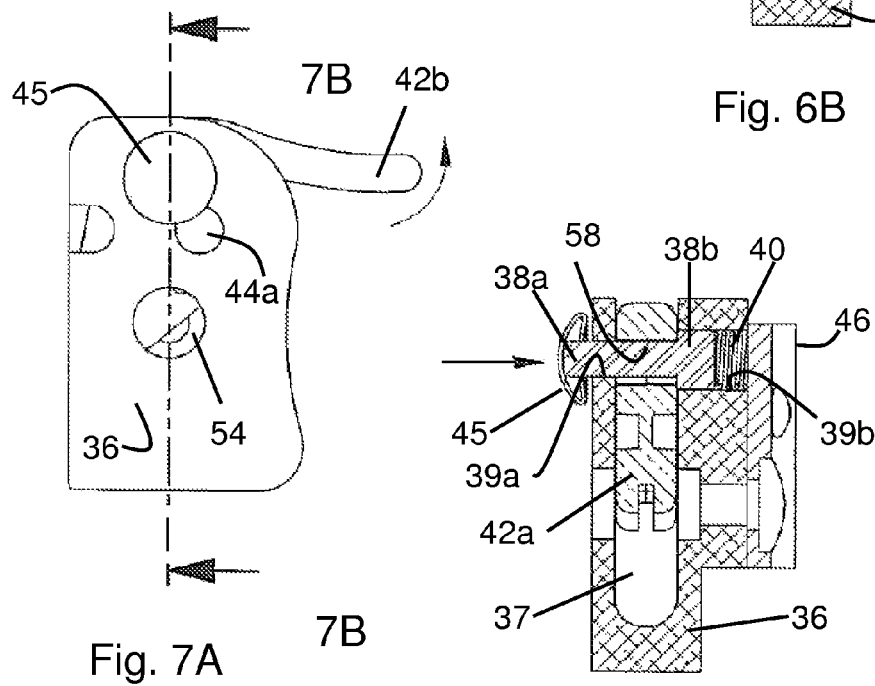
Fig. 7A
Fig. 7B

LOCKING CABLE ACTUATOR

CROSS-REFERENCE TO RELATED APPLICATIONS

This application claims the benefit of U.S. Provisional Application No. 61/252,816, filed Oct. 19, 2009, the disclosure of which is incorporated herein by reference.

BACKGROUND OF THE INVENTION

This invention relates in general to wheelchairs. In particular, this invention relates to a cable actuator for a wheelchair.

Wheelchairs are a class of personal mobility vehicle that provides greater ambulatory freedom to persons having limited movement abilities. A frame supports a seating assembly having a seat bottom and a backrest. The frame also supports a plurality of wheels that may be power driven or manually operated. Wheelchairs, and in particular manually operated wheelchairs, may be provided with some form of braking system to fix at least one wheel relative to the frame. These braking systems typically rely on an over-center actuation mechanism that frictionally engages a tire when applied. Such braking systems for wheelchairs are typically applied as parking brakes having only applied and released positions. Actuators for these braking systems are often located in close proximity to the tire and, consequently, may be difficult to access by both a user and an attendant.

It would be desirable to provide a wheelchair braking system that is easy to access by both a user and an attendant.

SUMMARY OF THE INVENTION

This invention relates to a cable actuator comprising a housing; a handle, and locking pin. The handle is pivotally connected to the housing and moveable between a released position and a locked position. The handle has a slot that terminates in a locking detent. The locking pin has a first end configured to pass through the slot and a second end configured to engage the locking detent when the handle is moved to the locked position.

In one aspect of the invention, the locking pin is biased toward engagement with the locking detent such that when the handle is pivoted to the locked position, the locking detent aligns with the locking pin and causing the second end to engage the locking detent. The handle also engages a cable at a cable first end, and the cable is connected to an actuated wheelchair system at a second end. The actuated wheelchair system may be configured as one of a wheel lock, a service brake, a parking brake, a latch mechanism, a seat position adjuster, a seat assembly tilt mechanism, and a backrest tilt mechanism.

The invention further relates to a wheelchair that comprises a frame, a wheel mounted to the frame and configured for selective rotation relative to the frame, a seat mounted to the frame; and a cable actuator. The cable actuator has a housing, a handle and a locking pin. The handle is pivotally connected to the housing and is configured to move between a released position and a locked position. The locking pin has a first end configured to pass through the handle and a second end configured to lock the handle in relation to the housing when the handle is moved to the locked position. The handle further engages a cable at a cable first end and an actuated wheelchair system engages the cable at a cable second end. The handle further includes a slot terminating in a locking detent. The locking pin is biased toward engagement with the locking detent such that movement of the handle to the locked position causes the second end of the locking pin to engage the locking detent.

In one embodiment, the actuated wheelchair system is configured as a wheel lock assembly that includes a wheel lock and a locking hub. The wheel lock includes a wheel lock bolt that is responsive to movement of the cable actuator such that the wheel lock bolt engages one of a plurality of apertures of the locking hub to prevent rotation of the wheel relative to the frame. In another embodiment, the wheel lock bolt is biased toward a retracted position such that the handle of the cable actuator is biased toward the released position.

The invention further relates to a personal mobility vehicle that includes a frame, a wheel, and a cable actuator. The wheel is mounted to the frame and configured for rotation relative to the frame. The cable actuator has a housing, a handle and a locking pin. The handle is pivotally connected to the housing and is configured to move between a released position and a locked position. The locking pin has a first end configured to pass through the handle and a second end configured to lock the handle in relation to the housing when the handle is moved to the locked position. A service brake is connected to the cable actuator such that movement of the handle toward the locked position prevents the wheel from rotating relative to the frame. In one embodiment, the personal mobility vehicle is a walker. In another embodiment, the personal mobility vehicle is a scooter.

Various aspects of this invention will become apparent to those skilled in the art from the following detailed description of the preferred embodiment, when read in light of the accompanying drawings.

BRIEF DESCRIPTION OF THE DRAWINGS

FIG. 6A is an elevational view of the cable actuator of FIG. 4 shown in a locked condition.

FIG. 6B is a cross sectional view of the cable actuator of FIG. 6A, taken along line 6B-6B.

FIG. 7A is an elevational view of the cable actuator of FIG. 4 shown in an unlocked condition.

FIG. 7B is a cross sectional view of the cable actuator of FIG. 7A, taken along line 7B-7B.

DETAILED DESCRIPTION OF THE PREFERRED EMBODIMENT

Figure 1:
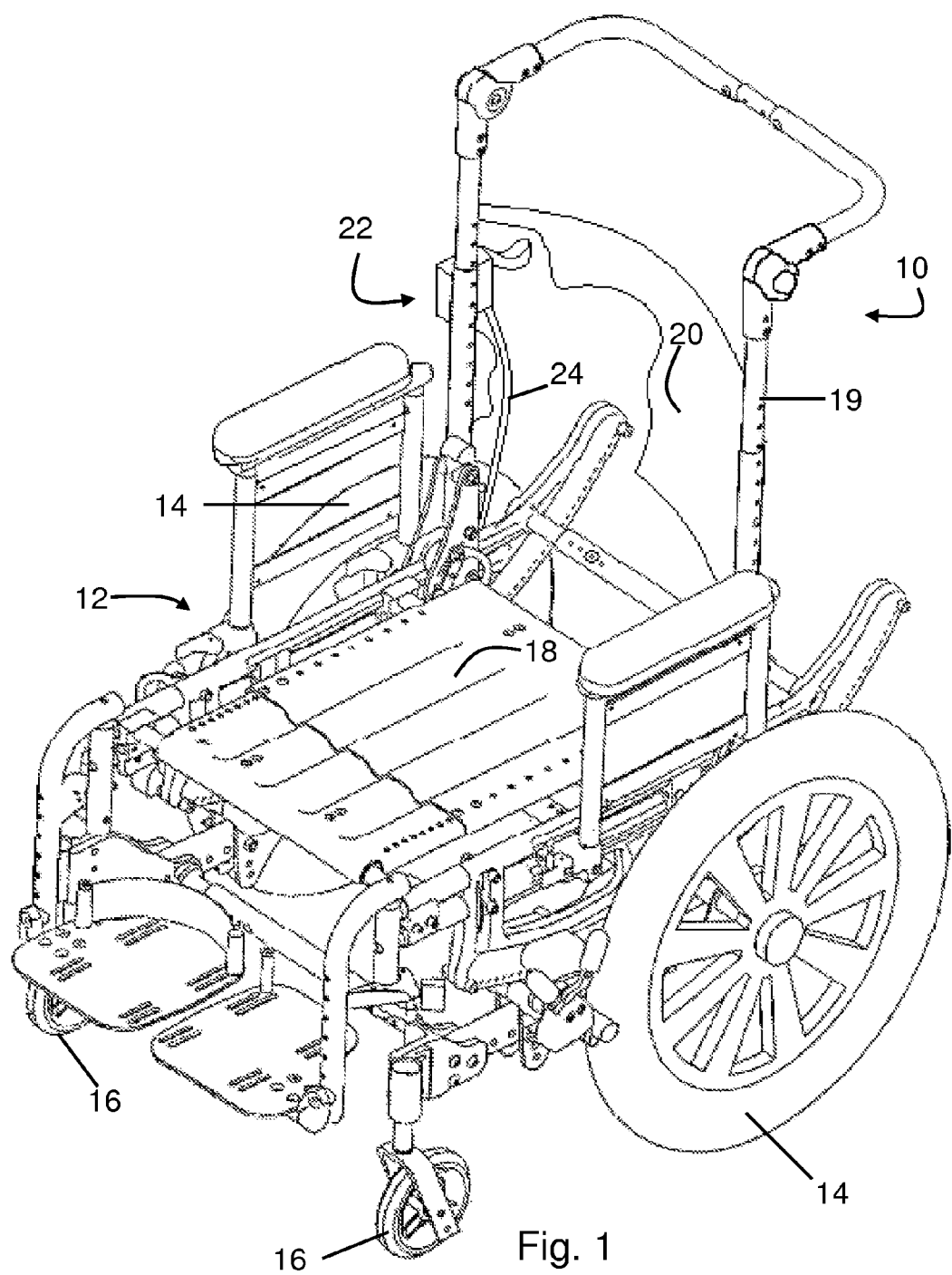
FIG. 1 is a perspective view of a wheelchair having an embodiment of a cable actuator.

Referring now to the drawings, there is illustrated in FIG. 1 a wheelchair, shown generally at 10. The wheelchair 10 includes a frame 12, a pair of drive wheels 14, a pair of caster wheels 16, a seat 18, upright canes 19, and a backrest 20. Though illustrated as a manually operated wheelchair, the wheelchair 10 may be configured as any type of personal mobility vehicle or mobility aid including, for example, a power driven wheelchair, a scooter, a walker, and the like. The wheelchair 10 includes a cable actuator 22 connected to an actuated wheelchair system by a cable 24, such as, for example, a Bowden cable. The cable 24 may alternatively be a rod, hydraulic plunger assembly and fluid line, or any other mechanically actuated device. The cable actuator 22 may actuate, in addition to the cable 24 or in the alternative, an electronic mechanism, such as a rheostat or a switch and a wire.

Figure 2:
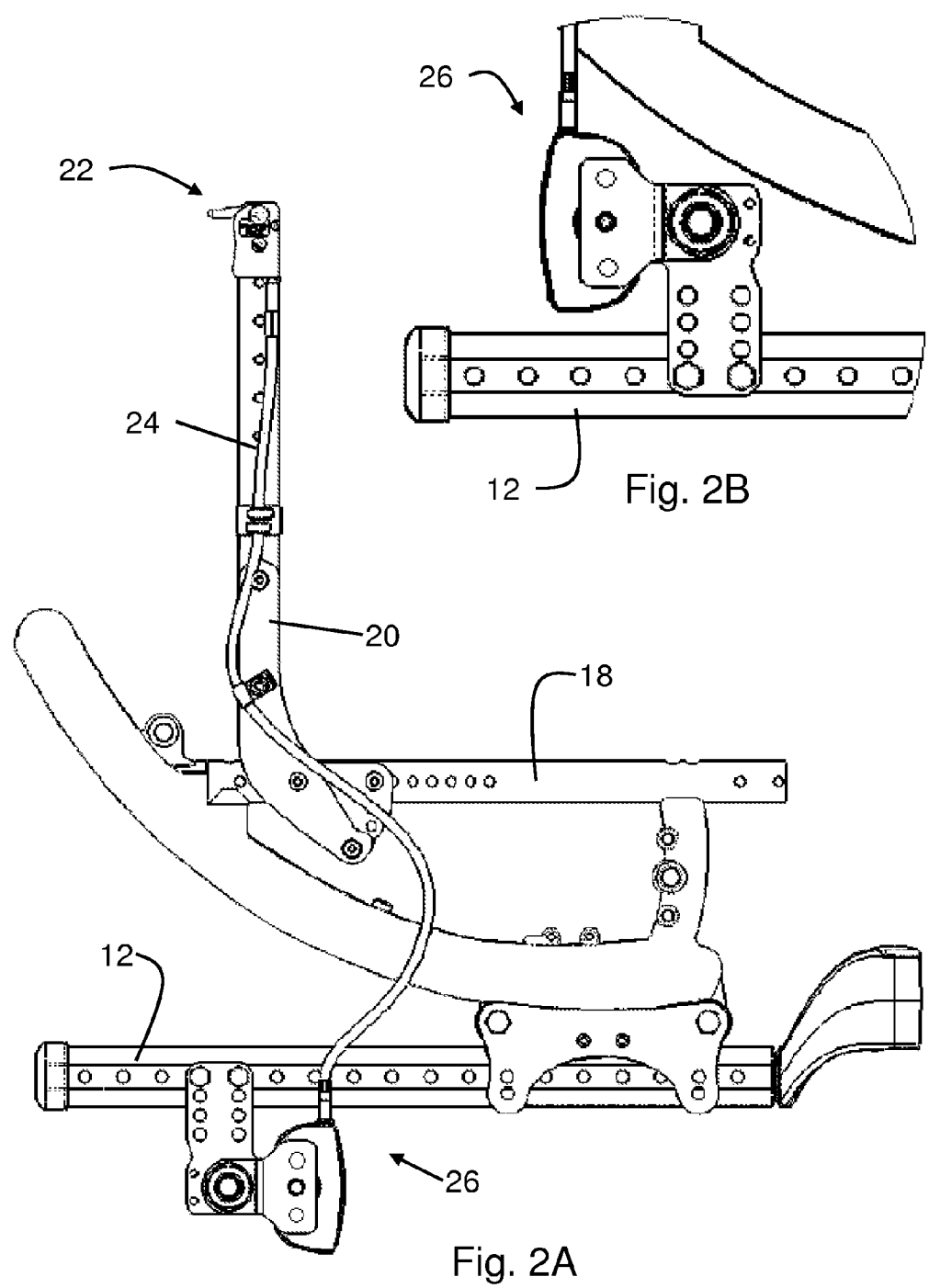
FIG. 2A is an elevational view of a portion of a wheelchair having an embodiment of a cable actuated system that includes a cable actuator.
FIG. 2B is an enlarged elevational view of an alternative embodiment of a portion of the cable actuated system of FIG. 2A.

Referring now to FIGS. 2A and 2B, there is illustrated an embodiment of a wheelchair component 26, that is actuated by the cable actuator 22 and the cable 24. The wheelchair component 26 is illustrated as part of the actuated wheelchair system, such as a brake system that may be configured as a wheel lock, a service brake, a parking brake, and the like. The actuated wheelchair system, however, may be any functional component, or group of components, that produces an output for use with a personal mobility vehicle based on an input, such as operation of the cable actuator 22. In other embodiments, the wheelchair component 26 may be a latch mechanism, a seat position adjuster, a seat assembly or backrest tilt mechanism, and the like. For explanation purposes only, the cable actuator 22 will be described in the context of a wheel lock 26. As shown in FIG. 2B, the wheel lock 26 may be mounted at other points or orientations relative to the frame 12 or any other suitable component.

Figure 3:
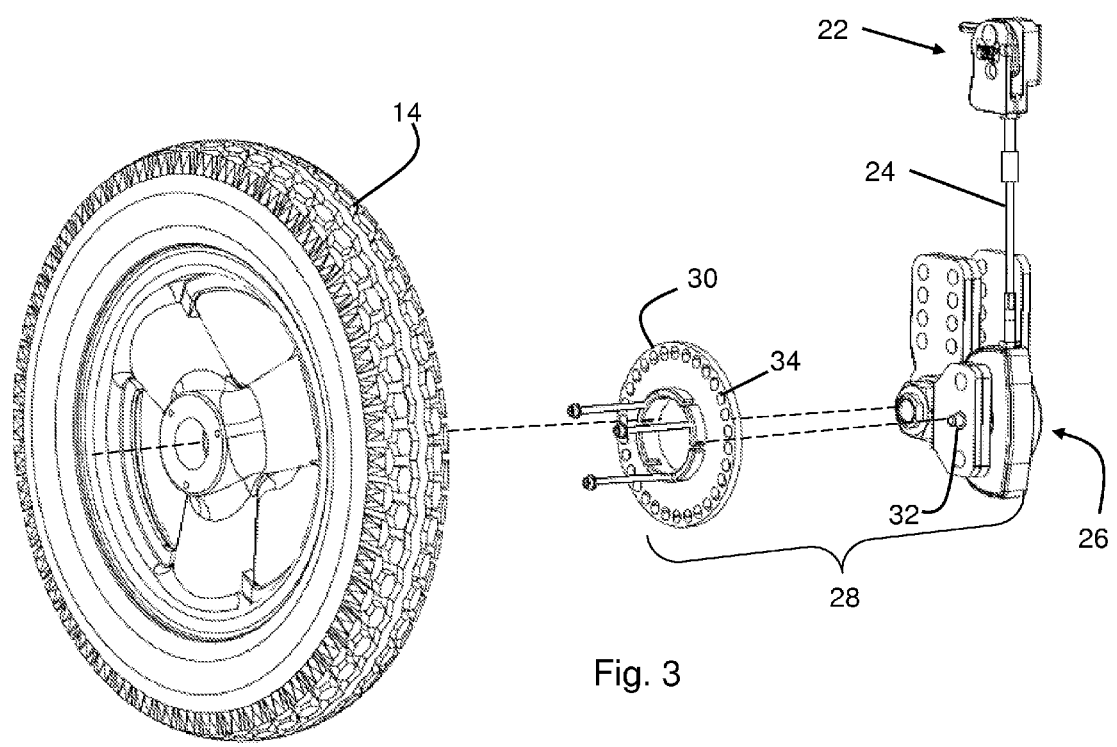
FIG. 3 is an exploded view of an embodiment of a wheelchair locking brake system having a cable actuator.

In the illustrated embodiments of FIGS. 2A, 2B, and 3, the actuated wheelchair system is illustrated as a wheel lock assembly 28 that includes a locking hub 30 that engages with the wheel lock 26 to prevent rotation of the wheel 14 relative to the wheelchair frame 12. In one embodiment, the wheel lock assembly 28 is configured to function as a static state parking brake. The wheel lock 26 includes an extendable and retractable wheel lock bolt 32 that is selectively engaged with one of a plurality of locking holes 34 disposed about the locking hub 30. The wheel lock 26 is responsive to movement of the cable actuator 22 and cable 24 to extend or retract the wheel lock bolt 32. The wheel lock bolt 32 may be biased toward an extended position or a retracted position by way of a resilient member (not shown).

Figures 4, 5:
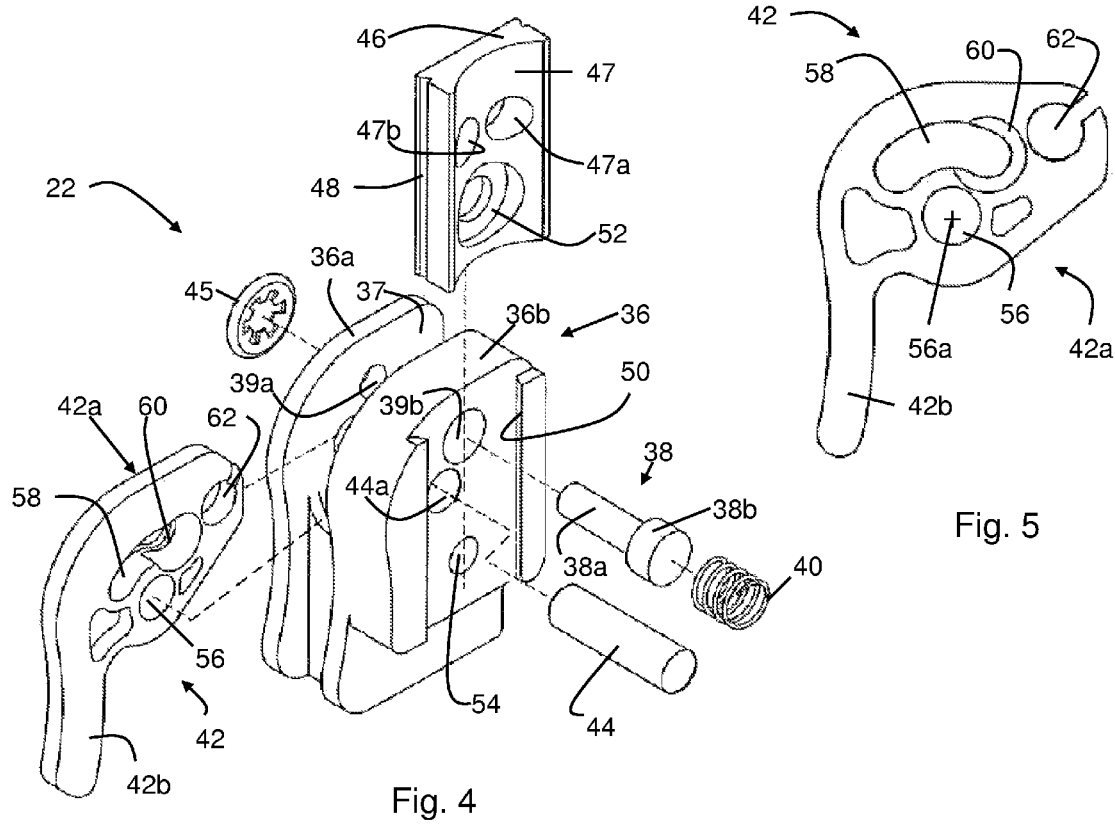
FIG. 4 is an exploded view of a cable actuator.
FIG. 5 is an elevational view of a cable actuator handle of the cable actuator of FIG. 4.

Referring now to FIG. 4, the cable actuator 22 comprises a housing 36, a handle lock and release pin 38, a pin biasing spring 40, a handle or lever 42, and a pivot pin 44. The housing 36 is illustrated having a outer side portion 36a and an inner side portion 36b. The outer side portion 36a is configured to be exposed or at least partially accessible to the user. The inner side portion 36b is configured to permit assembly of the components comprising the cable actuator 22 and to permit attachment thereof to a suitable mounting or component retaining structure. Alternatively, the housing 36 may be formed in two separate halves that are disposed, in a spaced apart relationship, on either side of the handle 42. The lock and release pin 38 includes a shank portion 38a and a lock portion 38b. The lock portion 38b is shown as a cylinder having a larger diameter than the shank portion 38a. Alternatively, the lock portion 38b may be any shape that protrudes radially beyond a part of the shank portion 38a. For example, the lock portion may have a shape that is hexagonal, oval, rectangular, square, or star-shaped. Alternatively, the lock portion may be two blades or pins extending radially from the end of the shank 38a.

Figure 8:
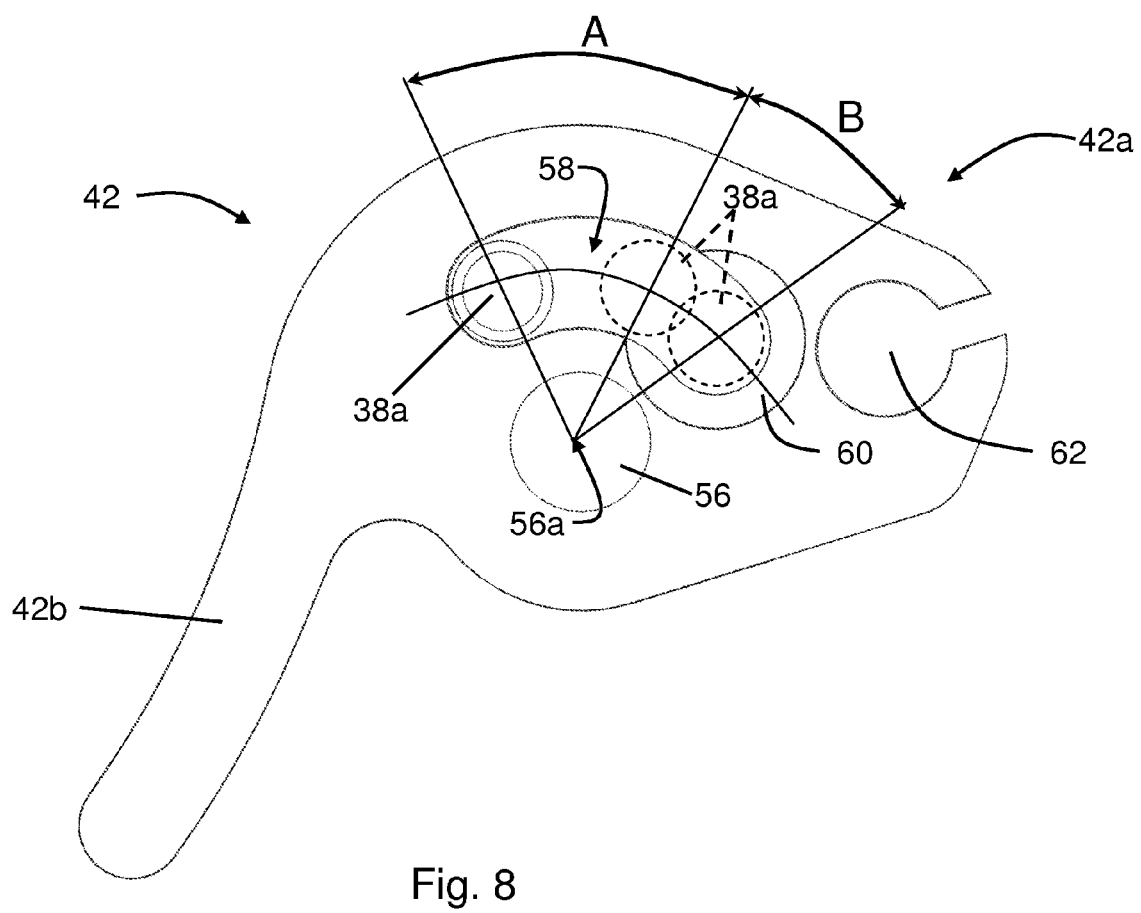
FIG. 8 is an enlarged view of the cable actuator handle of FIG. 5 showing relative positions of components for dynamic and static braking conditions.

The housing 36 includes a slot 37 within which the handle 42 is mounted for articulation through a range of motion. The handle 42 is configured to lock at the end of travel of the range of motion. For purposes of explaining the operation of the cable actuator, one embodiment of the wheel lock assembly 28 may be a dynamic state service brake application, where the service brake provides a progressively applied stopping force. The service brake may be a disk brake, a drum brake, a clamping-type brake (such as a bicycle brake), and the like. As shown in FIG. 8, the range of motion of the handle 42 relative to the shank portion 38a of the lock and release pin 38 may have two ranges, a first range of motion "A" where the cable actuator may progressively apply a braking force, i.e., the more handle 42 is moved, the more braking force is applied. A second range of motion "B" permits the handle to assume a locked position relative to the housing. When moved through range of motion "B", to the end of travel of the handle 42, the service brake is applied and remains applied (as a static state parking brake) until the handle 42 is released by moving the lock and release pin 38 to the release position.

In an alternative embodiment, the wheel lock assembly 28 may include both a dynamic state service brake and a separate, static state parking brake. The dynamic state service brake may be configured to be applied as the handle 42 is moved the first range of motion "A" and released when the static state parking brake is engaged during the second range of motion "B".

The housing 36 also includes apertures that permit the lock and release pin 38, the biasing spring 40, and the pivot pin 44 to engage the handle 42. The shank portion 38a of the lock pin 38 extends through a shank aperture 39a and a lock bore 39b and beyond the housing 36. Though illustrated as being round bores having different sizes, the bores 39a and 39b may be similarly sized and/or of different geometries. For example, the shank 38 and the cooperating shank aperture 39a may be hexagonally shaped. The lock portion 38b and the lock bore 39b may also be hexagonal and include a locking pin (not shown) that extends radially from the lock portion 38b. The locking pin may be oriented to engage a corresponding relief or similarly shaped bore in the handle 42. The protruding end of the shank portion 38a may terminate in a snap-on button 45. The lock portion 38b and the spring 40 are received within the lock bore 39b. As will be described below in detail, the lock portion 38b selectively extends into the slot 37, and into engagement with the handle 42, when a locked condition is desired. The pivot pin 44 extends through a pivot bore 44a formed in the housing 36. In one embodiment, the pivot bore 44a is a blind hole that permits passage of the pivot pin 44 through the slot, but not completely through the housing 36. In an alternative embodiment, the pivot bore 44a extends completely through the housing 36. In this instance, the pivot pin 44 may have an enlarged end to retain the pin 44 within the housing 36 or the pivot bore may have a plug or cap fitted onto the outer side portion 36a.

A mounting plate 46 has a surface 47 configured to attach the cable actuator 22 to a portion of a wheelchair 10, such as the frame 12 or the upright canes 19 or handle, as shown in FIG. 1. The surface 47 may include attachment points, such as attachment points 47a and 47b, to fix the cable actuator 22 to the wheelchair 10. The mounting plate 46 is illustrated having a sliding dovetail 48 that cooperates with a mating dovetail 50 as part of the housing 36. Though shown as cooperating dovetail connections 48, 50, the mounting plate may be retained onto the handle by any shaped structure, such as a T-slot, or have no integrally formed retaining feature. The dovetail connection permits the cable actuator 22 to remain assembled together in an unbolted condition. The mounting plate 46, as illustrated, retains the locking pin 38, bias spring 40, and pivot pin 44 within the housing 36. The mounting plate 46 includes a bolt hole 52, illustrated as a counterbored bolt hole, that aligns with a threaded hole 54. A bolt (not shown) or other fastener extends through the mounting plate bolt hole 52 and engages with the threaded hole 54 to fix the mounting plate 46 relative to the housing 36.

As shown in FIGS. 4 and 5, the handle 42 includes a locking body 42a and a stem 42b. The locking body 42a of the handle 42 includes a plurality of apertures and features that align, either selectively or continuously, to actuate the cable 24 and provide a locked condition, where the wheelchair component, the wheel lock 26 in this embodiment, is held in an actuated state. The handle 42 includes a pivot bore 56 that is illustrated as being formed through the handle 42. Alternatively, the pivot bore 56 may be a blind hole. In one embodiment, the pivot pin 44 extends through the handle 42 and through most of the housing 36.

When the stem 42b is actuated by a user, the handle 42 is free to pivot about the pivot pin 44 through its range of motion relative to the housing 36. The handle 42 includes a locking slot 58 that terminates in a locking detent 60. In one embodiment, the locking slot 58 is an arcuate slot where the arced shape of the slot 58 is defined by a radius originating at a centerline 56a of the pivot bore 56. The handle includes a barrel aperture 62 configured to engage an end of the cable 24 and transfer rotational motion of the locking body 42a into axial movement of the cable 24. The cable 24 may have any suitable end configuration and the barrel aperture 62 may be configured to engage whatever cable end is provided. For example, the cable end may be an open end and the barrel aperture may be a set screw (not shown).

Referring now to FIGS. 6A,B and 7A,B, the cable actuator 22 is shown in a locked position (FIGS. 6A,B) and an unlocked position (FIG. 7A,B), respectively. In operation, the user actuates the stem 42b in a clockwise motion from an unlocked position, shown in FIG. 7A, to a locked position shown in FIG. 6A. When the handle 42 is in the unlocked position of FIG. 7A, the lock pin 38 is biased toward the locking body 42a by the spring 40. The arcuate slot 58 is sized such that the shank portion 38a of the lock pin 38 extends through the slot 58 and the locking body 42a is free to move relative to the locking pin 38. The lock portion 38b is shown being sized larger than the arcuate slot 58 and is biased into contact with the locking body 42a.

As the handle 42 is actuated to the locked position of FIG. 6A, the locking body 42a moves relative to the lock portion 38b. As the locking detent 60 is brought into alignment with the lock portion 38b of the lock pin 38, the biasing force of the pin biasing spring 40 engages the lock portion 38b into the locking detent 60. Though shown as a coil spring, the pin biasing spring may be any resilient member capable of generating an appropriate biasing force. The motion of engagement also extends the shank 38a and the button 45 out from the housing 36, as shown in FIG. 6B. The engagement of the lock portion 38b and the locking detent 60 prevents the handle 42 from being moved, relative to the housing 36, to the unlocked position by either the user or a reactive force within the cable 24.

In order to release the handle 42 from its locked position in FIGS. 6A, 6B, the button 45 is moved against the biasing force of the pin biasing spring 40 to cause the lock portion 38b to retract into the lock bore 39b from the detent 60. If so provided, the stem 42b of the handle 42 may flip up to the unlocked position by the reactive force within the cable 24. In an alternative embodiment, a clock-type coil spring or other resilient element (not shown) may bias the handle 42 into the unlocked position. This embodiment may be suited to an application where the cable 24 is a hydraulic plunger and fluid line or an electronic switch arrangement.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A personal mobility vehicle having a cable actuator, the cable actuator comprising:
    a housing;
    a handle pivotally connected to the housing and moveable between a released position and a locked position, the handle having a slot that terminates in a locking detent; and
    a locking pin having a first end configured to pass through the slot and a second end configured to engage the locking detent when the handle is moved to the locked position.

2. The personal mobility vehicle of claim 1 wherein the locking pin is biased toward engagement with the locking detent such that when the handle is pivoted to the locked position, the locking detent aligns with the locking pin and causes the second end to engage the locking detent.

3. The personal mobility vehicle of claim 2 wherein the handle and the housing include pivot bores that are co-aligned to accept a pivot pin that is configured to permit the handle to pivot relative to the housing, the slot is an arcuate slot disposed about the handle pivot bore, and a coil spring biases the locking pin toward engagement with the locking detent.

4. The personal mobility vehicle of claim 2 wherein the handle engages a cable at a cable first end, the cable connected to a wheelchair service brake at a second end, the slot defining a first range of motion between the released and the locked positions where the wheelchair service brake may progressively apply a braking force and a second range of motion that actuates the handle into the locked position.

5. The personal mobility vehicle of claim 1 wherein the handle engages a cable at a cable first end, the cable being connected to an actuated wheelchair system at a second end.

6. The personal mobility vehicle of claim 5 wherein the cable is one of a Bowden cable, a rod, a hydraulic plunger and fluid line, and a rheostat and wire.

7. The personal mobility vehicle of claim 5 wherein the actuated wheelchair system is one of a wheel lock, a service brake, a parking brake, a latch mechanism, a seat position adjuster, a seat assembly tilt mechanism, and a backrest tilt mechanism.

8. The personal mobility vehicle of claim 7 wherein the actuated wheelchair system is a wheel lock having a wheel lock bolt, biased in a release position and configured to engage one of a plurality of apertures of a wheel lock hub when the handle is actuated toward a locked position.

9. The personal mobility vehicle of claim 1 wherein the housing engages a mounting plate having a surface configured to attach to a portion of a wheelchair.

10. The personal mobility vehicle of claim 9 wherein the mounting plate includes a retaining feature configured to permit the locking pin to remain assembled to the housing in an unbolted condition.

11. The personal mobility vehicle of claim 10 wherein the mounting plate surface is a curved surface configured to attach to at least one of a frame and an upright cane.

12. A wheelchair comprising:
    a frame;
    a wheel mounted to the frame and configured for selective rotation relative to the frame;
    a seat mounted to the frame; and a cable actuator having a housing, a handle pivotally connected to the housing that is configured to move between a released position and a locked position, and a locking pin having a first end configured to pass through the handle and a second end configured to lock the handle in relation to the housing when the handle is moved to the locked position.

13. The wheelchair of claim 12 wherein the handle engages a cable at a cable first end and an actuated wheelchair system engages the cable at a cable second end, the actuated wheelchair system being configured as one of a wheel lock, a service brake, a parking brake, a seat position adjuster, a seat assembly tilt mechanism, and a backrest tilt mechanism.

14. The wheelchair of claim 13 wherein the actuated wheelchair system is configured as a wheel lock assembly including a wheel lock and a locking hub, the wheel lock including a wheel lock bolt that is responsive to movement of the cable actuator such that the wheel lock bolt engages one of a plurality of apertures of the locking hub to prevent rotation of the wheel relative to the frame.

15. The wheelchair of claim 14 wherein the wheel lock bolt is biased toward a retracted position such that the handle of the cable actuator is biased toward the released position.

16. The wheelchair of claim 15 wherein the handle includes a slot terminating in a locking detent, the locking pin being biased toward engagement with the locking detent such that movement of the handle to the locked position causes a portion of the locking pin to engage the locking detent.

17. The wheelchair of claim 13 wherein the actuated wheelchair system is configured as a service brake and the handle includes a slot, the slot defining a first range of motion between the released and the locked positions where the wheelchair service brake may progressively apply a braking force and a second range of motion that actuates the handle into the locked position such that the service brake functions as a static state parking brake.

18. A personal mobility vehicle comprising:
a frame;
a wheel mounted to the frame and configured for rotation relative to the frame;
a cable actuator having a housing, a handle pivotally connected to the housing that is configured to move between a released position and a locked position, and a locking pin having a first end configured to pass through the handle and a second end configured to lock the handle in relation to the housing when the handle is moved to the locked position; and
a service brake connected to the cable actuator such that movement of the handle toward the locked position prevents the wheel from rotating relative to the frame.

19. The personal mobility vehicle of claim 18 configured as a walker.

20. The personal mobility vehicle of claim 18 configured as a scooter.

* * * * *